No. 804,438. PATENTED NOV. 14, 1905.
C. G. SIMONDS.
TRANSMISSION MECHANISM.
APPLICATION FILED JUNE 23, 1904.
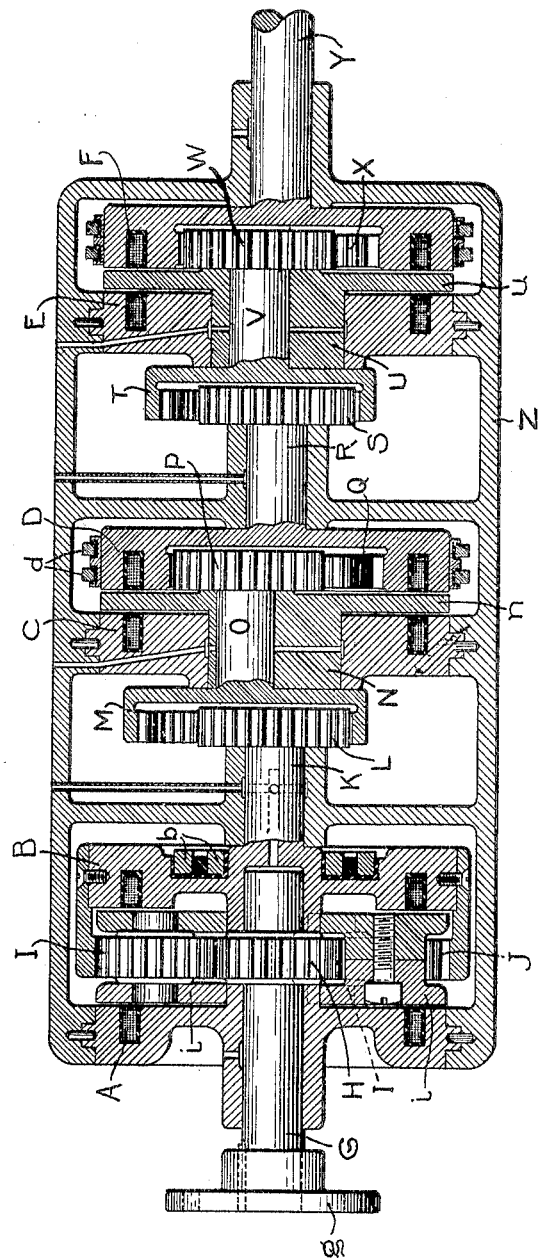
Witnesses.
Inventor:
Charles G. Simonds.
by Albt A. L. Davis
Att'y.

UNITED STATES PATENT OFFICE.

CHARLES G. SIMONDS, OF SCHENECTADY, NEW YORK, ASSIGNOR TO GENERAL ELECTRIC COMPANY, A CORPORATION OF NEW YORK.

TRANSMISSION MECHANISM.

No. 804,438.  Specification of Letters Patent.  Patented Nov. 14, 1905.

Application filed June 23, 1904. Serial No. 213,777.

*To all whom it may concern:*

Be it known that I, CHARLES G. SIMONDS, a citizen of the United States, residing at Schenectady, county of Schenectady, State of New York, have invented certain new and useful Improvements in Transmission Mechanisms, of which the following is a specification.

My invention relates to electromagnetic power-transmission mechanisms for variable speeds; and its object is to provide a novel form of electromagnetic variable-speed-transmission mechanism which is simple and compact in construction, efficient in operation, and readily controllable to give a plurality of speeds in either direction.

A transmission-gear constructed in accordance with my invention is consequently particularly well adapted for use in automobiles.

My invention will best be understood by reference to the accompanying drawing, in which G represents the driving-shaft, adapted to be connected by a coupling *g* to the engine or other source of power. The shaft G carries the pinion H, which is connected to the internal gear J by the planetary gears I I, which are carried by the plates *i i*.

A is a stationary magnetic clutch mounted within the casing Z and adapted when energized to hold the plates *i*, carrying the gears I, stationary. When this is done, the pinion H drives the internal gear J in the opposite direction to that in which pinion H is rotating and with a speed depending upon the relative sizes of the gears.

B is a second magnetic clutch carried by the internal gear J and energized by means of the collector-rings *b*. When this clutch is energized, the plate *i*, carrying the gears I, is locked to the internal gear J, and rotation of gears I relative to gear J is prevented. Consequently when clutch B is energized gear J rotates with pinion H, and the shaft K, on which gear J is mounted, is locked to shaft G, the connecting-gears rotating as a single mass of metal. Thus by energizing clutch A or clutch B the direction of rotation may be reversed.

Shaft K carries the pinion L, which engages an internal gear M, mounted on the shaft O. The shaft O is eccentrically mounted in the member N, which is itself rotatably mounted in the casing with its axis alined with shaft K. The shaft O carries a pinion P, which engages a second internal gear Q. The member N has a flange *n*, which is adapted to be engaged either by the stationary magnetic clutch C or by the clutch D, which is carried by internal gear Q and energized by means of the collector-rings *d*. The operation of this part of the mechanism is as follows: When clutch C is energized, member N is held stationary, and shaft O rotates as though it were mounted in fixed bearings in the casing. Shaft K drives shaft O through pinion L and internal gear M, and shaft O in turn drives shaft R through pinion P and internal gear Q. The speed reduction between shaft K and R consequently depends upon the ratio of the two pairs of gears. If clutch C is deënergized and clutch D is energized, on the other hand, member N is locked to internal gear Q and must revolve therewith. Rotation of shaft O in member N is consequently prevented, owing to the engagement of pinion P with gear Q, and member N and all the gears must rotate bodily with pinion L. Shaft K and shaft R are consequently locked together, the intermediate gears revolving like a solid mass of metal.

In order to obtain further speeds, a second combination of gears similar to that just described is provided. Shaft R carries pinion S, which engages an internal gear T, mounted on the shaft V. This shaft is eccentrically mounted in the rotatable member U and carries a pinion W, engaging an internal gear X, which is mounted on the driven shaft Y. The member U is provided with a flange *u*, which is adapted to be engaged by either the stationary clutch E or the clutch F, carried by the internal gear X. With this arrangement four speeds in either direction may be obtained. For the lowest speed forward the clutches B, C, and E are energized; for the second forward speed, clutches B, C, and F, since the gear reduction between shafts K and R is greater than that between R and Y. For the third speed clutches B, D, and E are energized, giving the smaller speed reduction, and for the highest forward speed clutches B, D, and F are energized, locking driven shaft Y to driving-shaft G, all the gears rotating as a single piece of metal. Thus it is seen that there are no gear losses at the highest speed. For the backward speeds clutch A is energized instead of clutch B, the combinations of the remaining clutches being the same as described.

Many modifications may be made in the construction and arrangement of parts without departing from the spirit of my invention, and I aim in the appended claims to cover all such modifications.

What I claim as new, and desire to secure by Letters Patent of the United States, is—

1. In a transmission mechanism, two alined shafts, gears carried at adjacent ends of said shafts, a member journaled between said shafts and in line therewith, a shaft extending through and journaled eccentrically in said member, gears carried at the opposite ends of said shaft and engaging the first-named gears, and means for holding said member stationary and for locking it to one of the first-named shafts.

2. In a transmission mechanism, an inclosing casing, two alined shafts journaled therein, gears carried at adjacent ends of said shafts, a member journaled in said casing between said shafts and in line therewith, a shaft extending through and journaled eccentrically in said member, gears carried at the opposite ends of said shaft and engaging the first-named gears, and means for holding said member stationary and for locking it to one of the first-named shafts.

3. In a transmission mechanism, an inclosing casing, two alined shafts journaled therein, gears carried at adjacent ends of said shafts, a member journaled in said casing between said shafts and in line therewith, a shaft extending through and journaled eccentrically in said member, gears carried at the opposite ends of said shaft and engaging the first-named gears, and magnetic clutches adapted to hold said member stationary and to lock it to one of the first-named shafts.

4. In a transmission mechanism, a series of alined shafts, gears carried at adjacent ends of said shafts, a series of members journaled between said shafts and in line therewith, shafts extending through and journaled eccentrically in said members, gears carried at opposite ends of each of said last-named shafts and engaging the first-named gears, and means for holding each of said members stationary and for locking it to one of the first-named shafts.

5. In a transmission mechanism, an inclosing casing, a series of alined shafts journaled in said casing, gears carried at opposite ends of said shafts, a series of members journaled in said casing between said shafts and in line therewith, shafts journaled eccentrically in said members, gears carried at the ends of said shafts and engaging the gears carried by two of the first-named shafts, and means for holding each of said members stationary and for locking it to one of the first-named shafts.

6. In a transmission mechanism, an inclosing casing, a series of alined shafts journaled in said casing, gears carried at opposite ends of said shafts, a series of members journaled in said casing between said shafts and in line therewith, shafts journaled eccentrically in said members, gears carried at the ends of said shafts and engaging the gears carried by two of the first-named shafts, and magnetic clutches adapted to lock each of said members to said casing or to one of the first-named shafts.

7. In a transmission mechanism, two alined shafts, a pinion carried at the end of one of said shafts, an internal gear carried at the adjacent end of the other shaft, a member journaled between said shafts and in line therewith, a shaft extending through and journaled in said member, a pinion carried at one end of the last-named shaft and engaging said internal gear, an internal gear carried at the other end of said last-named shaft and engaging the first-named pinion, and means for holding said member stationary and for locking it to one of the first-named shafts.

8. In a transmission mechanism, an inclosing casing, a series of alined shafts journaled in said casing, adjacent shafts carrying at their adjacent ends a pinion and an internal gear respectively, a series of members journaled between said shafts and in line therewith, shafts extending through and journaled eccentrically in said members and each carrying at its opposite ends a pinion and an internal gear respectively each engaging respectively one of said first-named gears and pinions, and magnetic clutches adapted to lock each of said members to said casing and to one of the first-named shafts.

9. In a transmission mechanism, two alined shafts, a pinion carried by one shaft, an internal gear carried by the other shaft, a rotatable member having its axis alined with said shafts, a shaft journaled eccentrically in said member, a pinion and an internal gear carried by the last-named shaft and engaging respectively the first-named gear and pinion, and means for holding said member stationary and for locking it to one of the first-named shafts.

In witness whereof I have hereunto set my hand this 21st day of June, 1904.

CHARLES G. SIMONDS.

Witnesses:
BENJAMIN B. HULL,
HELEN ORFORD.